United States Patent [19]
Hong

[11] Patent Number: 5,278,663
[45] Date of Patent: Jan. 11, 1994

[54] METHOD FOR COMPENSATING THE VIBRATION OF AN IMAGE AND DEVICE THEREFOR IN A VIDEO CAMERA

[75] Inventor: Min-Seok Hong, Suwon, Rep. of Korea

[73] Assignee: SamSung Electronics Co. Ltd., Suwon, Rep. of Korea

[21] Appl. No.: 888,373

[22] Filed: May 26, 1992

[30] Foreign Application Priority Data

Jun. 28, 1991 [KR] Rep. of Korea .......... 1991-10976[U]

[51] Int. Cl.⁵ .............................................. H04N 5/91
[52] U.S. Cl. .................................. 358/335; 358/105; 358/136; 358/222
[58] Field of Search ............... 358/105, 136, 222, 335; H04N 5/91

[56] References Cited

U.S. PATENT DOCUMENTS

| | | | |
|---|---|---|---|
| 4,717,956 | 1/1988 | Moorhead | 358/135 |
| 4,837,632 | 6/1989 | Kubo | 358/136 |
| 5,060,074 | 10/1991 | Kinugasa | 358/222 |
| 5,138,445 | 8/1992 | Ueda | 358/105 |

*Primary Examiner*—Howard W. Britton
*Attorney, Agent, or Firm*—Robert E. Bushnell

[57] ABSTRACT

A method and circuit for compensating the vibration of an image by detecting the amount of motion of an input image. A sub-block is extracted from the entire screen and the amount of motion is detected by comparing the extracted sub-block with a sub-block extracted form a previous frame. Thus, the vibration is compensated for in response to a motion detecting value.

24 Claims, 6 Drawing Sheets

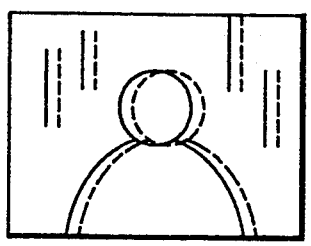
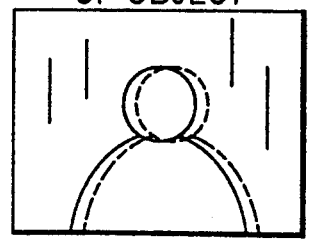
FIG. 2A    FIG. 2B
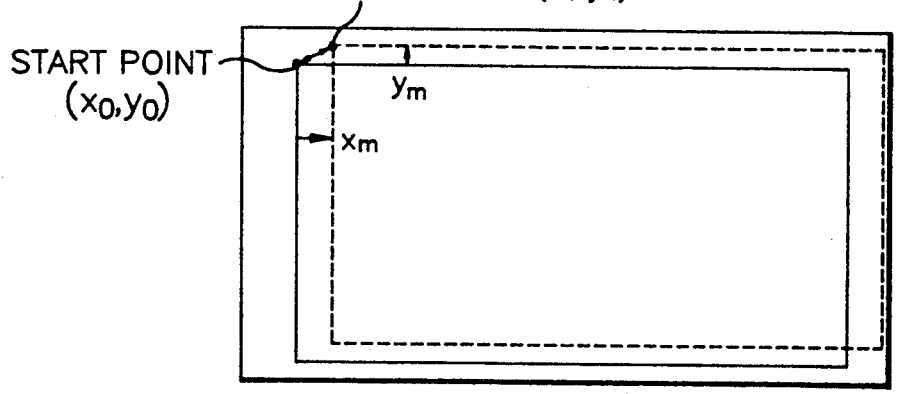
FIG. 3

— 5,278,663 —

METHOD FOR COMPENSATING THE VIBRATION OF AN IMAGE AND DEVICE THEREFOR IN A VIDEO CAMERA

BACKGROUND OF THE INVENTION

The present invention relates to a method for compensating for the vibration of an image and a device therefor in a video camera, and more particularly to a method and a device capable of compensating for the vibration of an image of a camera and recorder (hereinafter referred to as a camcorder) by detecting the amount of motion of an input image.

When photographing an object using a portable video camera, a vibration phenomenon of an entire screen is generated by the physical vibration of a user. If the object has been recorded on video tape together with the vibration, the vibration will appear on a reproducing screen, causing increased eye strain on a viewer.

SUMMARY OF THE INVENTION

It is therefore an object of the invention to provide a method and a device which can remove a vibration phenomenon by detecting the vibration in an entire screen through the use of a motion detecting apparatus and compensating for the vibration by a detected vibration signal.

In accordance with one aspect of the present invention, a sub-block is extracted from the entire screen and the amount of motion is detected by comparing the extracted sub-block with a sub-block extracted from a previous frame. Thus, the vibration is compensated for in response to a motion detecting value.

BRIEF DESCRIPTION OF THE DRAWINGS

For a better understanding of the invention, and to show how the same may be carried into effect, reference will now be made, by way of example, to FIGS. 1 to 9 of the accompanying drawings, in which:

FIGS. 2A and 2B are diagrams showing a vibration state and a motion state of an image and an object;

FIG. 3 is a diagram showing a compensation state of the vibration of FIG. 1;

DETAILED DESCRIPTION OF THE PREFERRED EMBODIMENT

Figure 1:
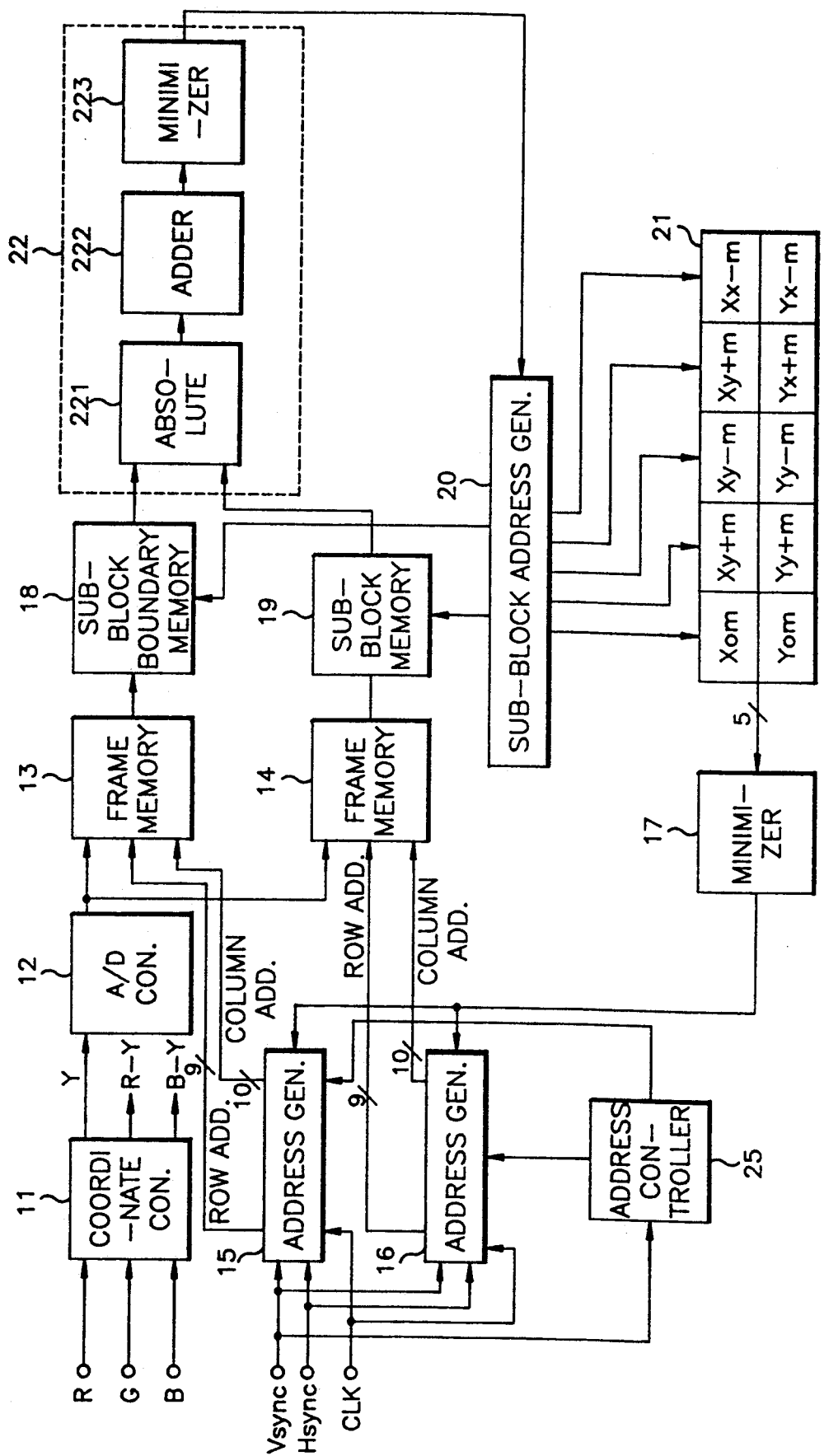
FIG. 1 is a block diagram of one embodiment of the present invention.

Referring to FIG. 1, chrominance signals R, G and B (red, green and blue) are converted into a luminance signal Y and color difference signals R-Y and B-Y by a coordinate converter 11. The luminance signal Y is converted into digital data by an analog-to-digital (A/D) converter 12. First and second address generators 15 and 16 generate row and column address data for storing output data of the A/D converter 12 by frames, in first and second frame memories 13 and 14, in response to vertical and horizontal synchronizing signals $V_{sync}$ and $H_{sync}$ and a clock signal CLK. The luminance data generated from the A/D converter 12 is stored in first and second frame memories 13 and 14 by frames, in response to the outputs of the first and second address generators 15 and 16. An address control circuit 25 receives the vertical synchronizing signal $V_{sync}$ to control the access operation of the first and second address generators 15 and 16. Sub-block boundary data generated from the first frame memory 13 is stored in a sub-block boundary memory 18 and sub-block data generated from the second frame memory 14 is stored in a sub-block memory 19.

A sub-block address generator 20 generates an address signal for assigning input and output data of the sub-block boundary memory 18 and the sub-block memory 19, and sub-block location data. An X and Y vector register 21 temporarily stores the sub-block location data in response to output of the sub-block address generator 20. A first minimizing circuit 17 supplies a minimum value among location vectors of the X and Y vector register 21 to the first and second address generators 15 and 16 in order to control a frame address. When the accumulated sum of a difference between output data of the sub-block boundary memory 18 and the sub-block memory 19 is a minimum value, an arithmetic circuit 22 supplies the minimum value to the sub-block address generator 20 in order to control a motion vector of the location data. The arithmetic circuit 22 includes an absolute value circuit 221 for obtaining an absolute value of a value obtained by subtracting an output value of the sub-block boundary memory 18 from that of the sub-block memory 19, an adder 222 for obtaining the sum of the output of the absolute value circuit 221 and a second minimizing circuit 223 for minimizing the output of the adder 222.

A camcorder is an apparatus photographing a moving picture and recording the picture onto a video tape, and the moving picture comprises the continuous flow of a still picture having 30 frames per second. It is known that there is a relationship between adjacent frames is. Therefore, the amount of motion can be detected by an image of the adjacent frame. The state variation of the amount of motion generated by the vibration of a user and the motion of an object are indicated in FIGS. 2A and 2B, respectively.

In FIGS. 2A and 2B, a solid line indicates a frame to be compared and a dotted line indicates a previous frame. In an image photographed by the vibration of a user, an entire screen is moved as shown in FIG. 2A. However, in an image photographed by the motion of an object, only a corresponding motion image is moved as shown in FIG. 2B. In order to compensate for the vibration, a recording screen is divided from an actual photographing screen and the amount of motion is extracted by detecting the vibration of the divided screen. Thus, the vibration can be compensated for by shifting a starting point on the basis of the extracted motion value.

In FIG. 3, if an actual photographing screen with a starting point (xo, yo) indicated by a solid line is converted into a screen with a starting point (xl, yl) indicated by a dotted line, and the amount of motion (xm, ym) is detected, an image without vibration can be recorded onto a video tape by shifting the starting point in response to the detected motion value.

Figure 4:
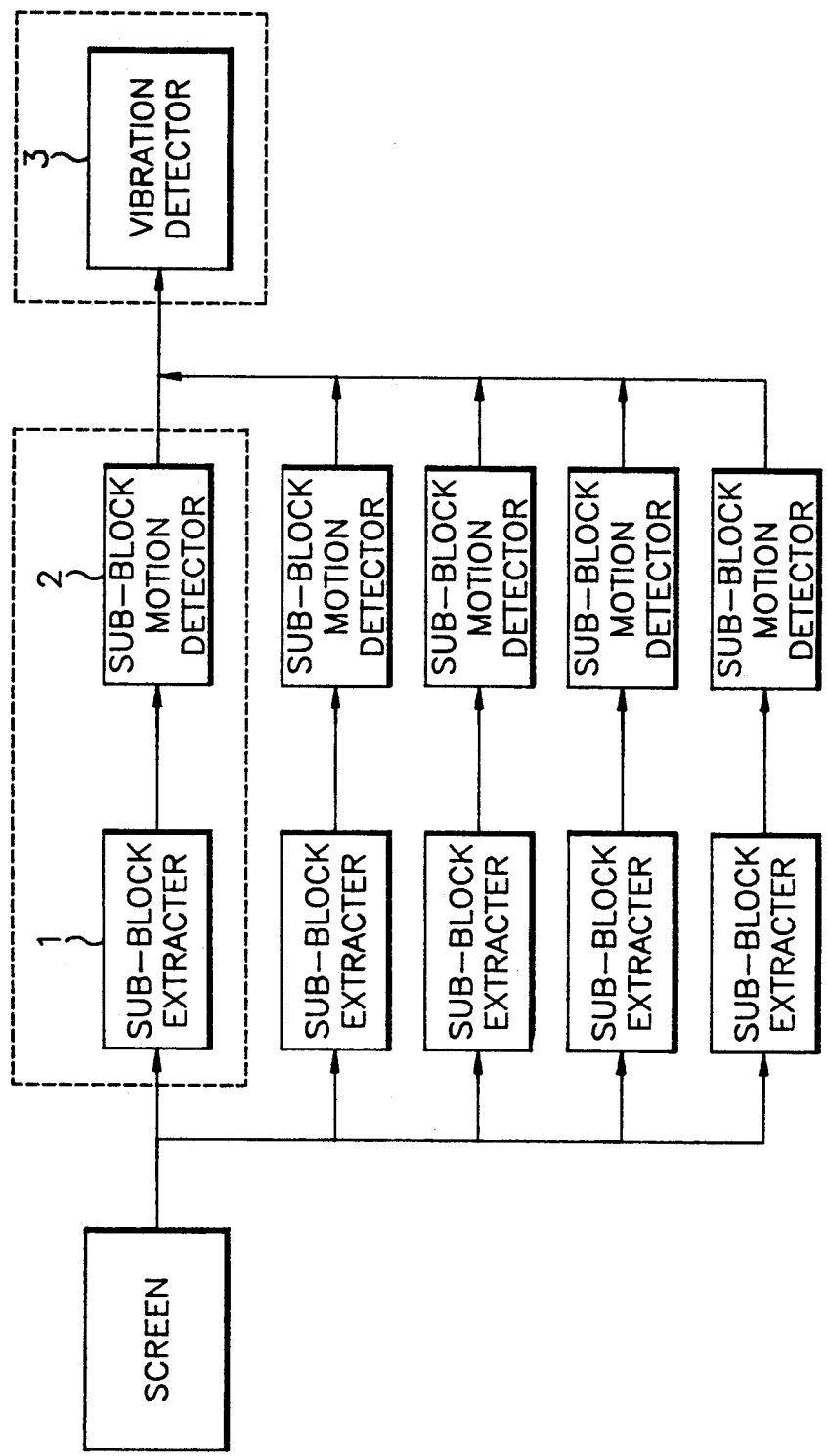
FIG. 4 is a block diagram showing sub-block extracters of FIG. 1.
Figure 5:
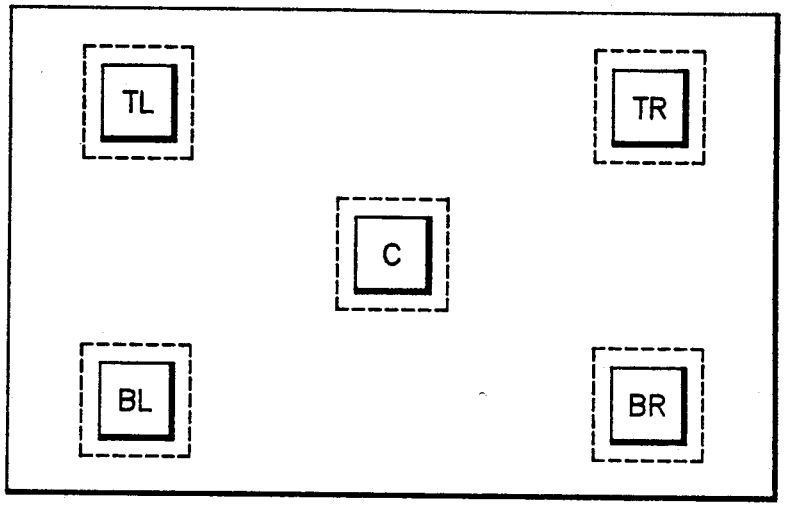
FIG. 5 is a diagram showing an example of a sub-block extraction of FIG. 4.

Turning now to FIG. the address control circuit 25 internally counts the vertical synchronizing signal $V_{sync}$, and when the first frame memory 13 writes the luminance data enables the first address generator 15 to generate row and column address data. Further, when it is time to complete the data store in the first frame memory 13, the address control circuit 25 controls the second address generator 16 to generate row and column address data for writing the luminance data of a next frame. If the sequentially supplied luminance data of two frames is completely stored in the first and second frame memories 13 and 14, the address control circuit 25 controls the first and second address generators 15 and 16 so as to extract a given sub-block with respect to an image in the first and second frame memories 13 and 14 as shown in FIG. 4. The sub-block is extracted at every frame and must store all data in a given boundary. In order to store sub-block data of a current frame and a previous frame, an address signal is supplied from the first and second address generators 15 and 16. It is assumed that 5 sub-blocks are selected as shown in FIG. 5 and it is desirable to select the size of a sub-block as between $8 \times 8$ to $16 \times 16$ pixels. Moreover, it is preferable select 4 or more sub-blocks, evenly distributed from the entire screen.

The sub-block data selected in the first and second frame memories 13 and 14 is read out by the control of the first and second address generators 15 and 16 and recorded in the sub-block boundary memory 18 and the sub-block memory 19. The sub-block boundary memory 18 has a larger area than the selected sub-block so as to sufficiently record the selected sub-block data. The sub-block data is recorded such that a boundary can appear with respect to the sub-block, and image data of the sub-block boundary memory 18 is written and read in response to a write/read control signal and an address signal generated from the sub-block address generator 20. In FIG. 5, a boundary recorded in the sub-block boundary memory 18 is designated by a dotted line to detect the amount of motion. The boundary has the size capable of generating the maximum vibration. The vibration repeatedly occurs in every direction on the temporal axis, and since the motion is not large, it is sufficient to allocate 10 pixels. The relation between the sub-block and the boundary can be expressed as follows:

$$BBs = Bs + Tmax \quad (1)$$

Where BBs is the size of the boundary of the sub-block, Bs is the size of the sub-block, and Tmax is maximum vibration.

The sub-block data selected in the second frame memory 14 is stored in the sub-block memory 19, and written and read in response to the control and address signals generated from the sub-block address generator 20. The sub-block written in the sub-block boundary memory 18 and the sub-block memory 19 is supplied to the absolute value circuit 221 of the arithmetic circuit 22 where a difference between sub-blocks of a current frame and a previous frame is obtained. That is, in the absolute value circuit 221, a sub-block value of the sub-block memory 19 is subtracted from that of the sub-block boundary memory 18 and an, absolute value is obtained from the calculated value. If values obtained from the absolute value circuit 221 are all added in the adder 222, the sum can be represented by the following equation:

$$E_o = \sum_{y=0}^{Bs-1} \sum_{x=0}^{Bs-1} d(x,y) \quad (2)$$

Figure 6:
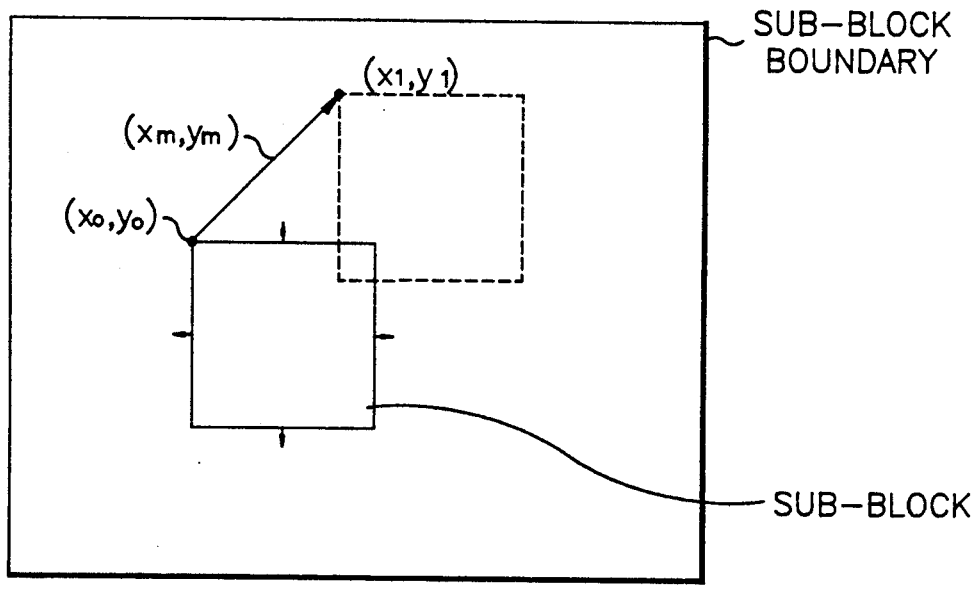
FIG. 6 is a diagram showing detection of the amount of motion.

If the detecting area of the sub-block of the first and second frame memories 13 and 14 is 10 pixels, the sum of the sub-block is processed by 10 times through the absolute value circuit 221 and the adder 222 of the arithmetic circuit 222, the sub-block being moved by one pixel in every direction. If values Eo, Ey+, Ey−, Ex+ and Ex− are obtained, a minimum value is searched in the second minimizing circuit 223 by comparing the values Eo Ey+, Ey−, Ex+ and Ex−. The location having a minimum value is most nearly similar to that of a previous frame. If Eo has the minimum value, there is no motion at the corresponding sub-block. If any other value except for Eo has a minimum value, there is motion in a corresponding direction. Then, processes for detecting a minimum value are continually performed by moving the starting point (xo, yo) to the corresponding direction until Eo has a minimum value. Finally, as shown in FIG. 6, the starting point (xo, yo) is shifted to a compensated starting point (x1, y1) and it will be readily appreciated that the data in the starting point (xo, yo) of a previous frame is shifted to the compensated starting point (x1, y1).

Figure 7:
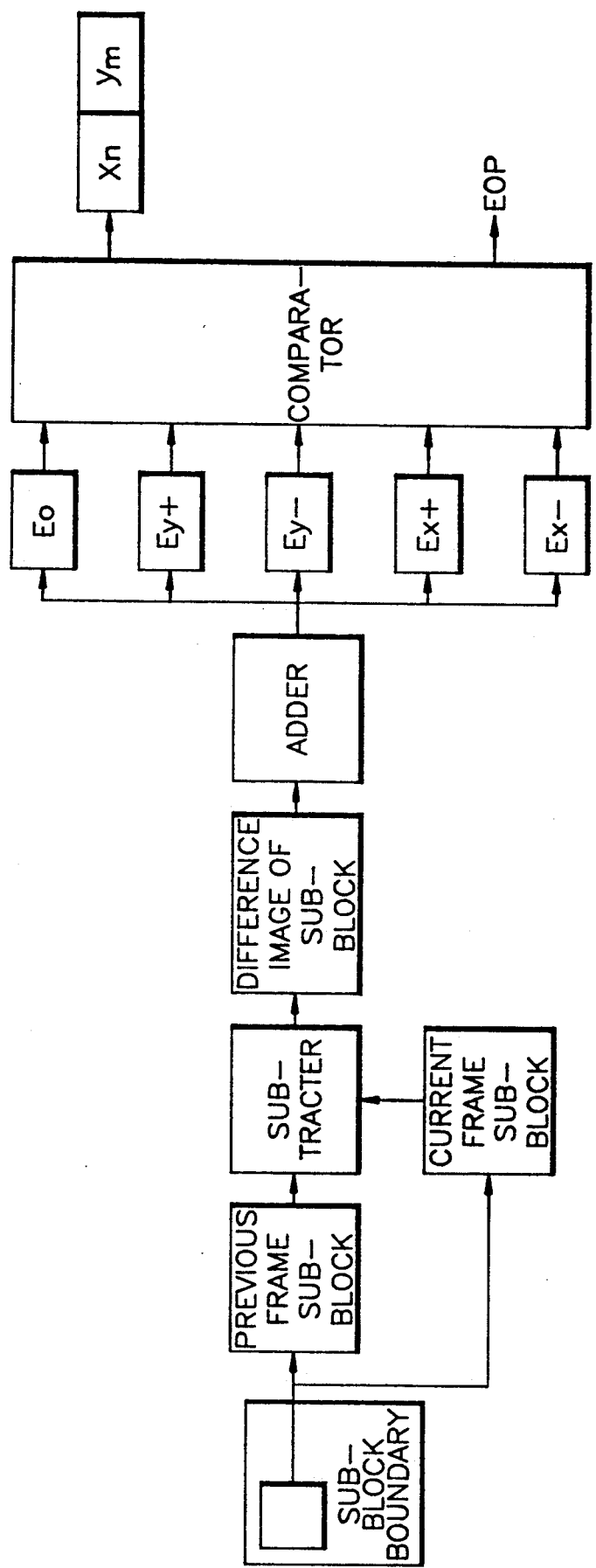
FIG. 7 is a block diagram of a circuit for detecting the amount of motion.
Figure 8A:
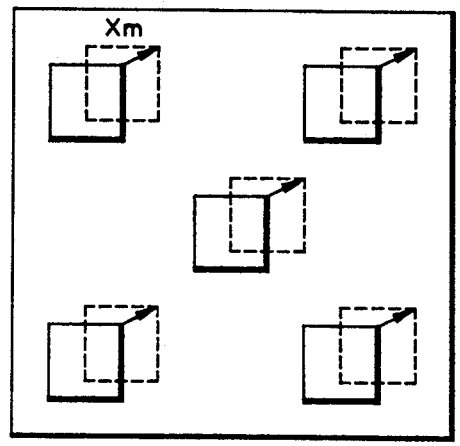
FIGS. 8A and 8B are diagrams showing the motion detection for the vibration state and motion state of an object, respectively.
Figure 8B:
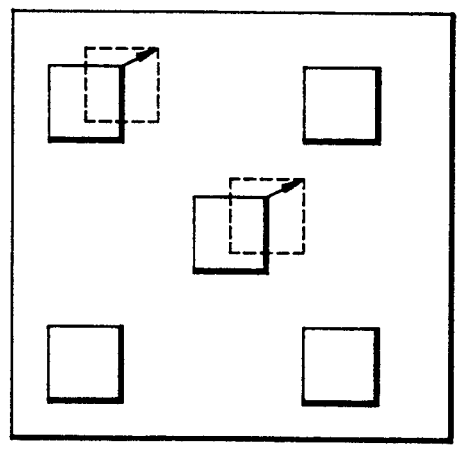

The process for detecting the motion is shown in FIG. 7. First, a difference between the sub-blocks is calculated in the absolute value circuit 221, and then an accumulated sum is obtained in the adder 222. Thereafter, a minimum value is selected by a comparator of the second minimizing circuit 223 to detect the motion. The minimum value is supplied to the sub-block address generator 20. The motion detection of the sub-block is performed for all sub-blocks from the entire screen as shown in FIG. 5. If the detecting area of each sub-block is 10 pixels, the motion is detected by processing 10 times. When the screen is moved by the vibration, the constant amount of motion is detected for all blocks and the direction thereof is nearly equal to each other as shown in FIG. 8. When an object is moved, the motion is detected for some of the sub-blocks, and the amount of the motion and the direction thereof may be different. According to the above illustrated motion detection characteristic, the vibration can be sensed and a motion detecting value is supplied to the sub-block address generator 20 by detecting the amount of motion.

When the motion detecting value is supplied to the sub-block address generator 20, location vector data is recorded in the X and Y vector register 21, in response to a location address value applied to the sub-block boundary memory 18 and the sub-block memory 19. If the location vector values of 5 sub-blocks of the first and second frame memories 13 and 14 are all stored in the X and Y vector register 21, a minimum value is selected in the first minimizing circuit 17 and supplied to the first and second address generators 15 and 16. In this case, if the first and second address generators 15 and 16 supply address data to the first and second frame memories 13 and 14 in response to the location vector value generated from the first minimizing circuit 17, a starting point is shifted as much as the location vector value as shown in FIG. 3. Therefore, a screen without vibration can be obtained.

As described above, since the vibration of a screen can be compensated for by detecting the amount of motion, an image signal having good quality can be recorded.

While the invention has been particularly shown and described with reference to a preferred embodiment, it will be understood by those skilled in the art that modifications in detail may be made without departing from the spirit and scope of the invention.

What is claimed is:

1. A circuit for compensating for the vibration of an image, comprising:
   converting means for converting chrominance signals into a luminance signal Y and color difference signals R-Y and B-Y;
   analog-to-digital converting means for receiving and converting said luminance signal Y into a digital luminance signal;
   first address generating means and second address generating means for generating row and column address data in response to vertical and horizontal synchronizing signals and a clock signal;
   first frame memory means for storing a first frame of said digital luminance signal generated from said analog-to-digital converting means and second frame memory means for storing a second frame of said digital luminance signal delayed one frame from said first frame, in response to said row and column address data from said first and second address generating means, respectively;
   address controlling means for controlling said first and second address generating means;
   sub-block boundary memory means for receiving and storing sub-block boundary data generated from said first frame memory means;
   sub-block memory means for receiving and storing sub-block data generated from said second frame memory means;
   sub-block address generating means for generating sub-block location information, and an address signal assigning input and output data of said sub-block memory means and said sub-block memory means;
   X and Y vector register means for temporarily storing location data, in response to said sub-block information generated from said sub-block address generating means;
   first minimizing means for supplying a first minimum value among location vectors of said X and Y vector register to said first and second address generating means in order to control addresses of said first and second frame memory means; and
   arithmetic means receiving said sub-block boundary data and said sub-block data and for supplying a second minimum value among an accumulated sum of a difference between said sub-block boundary data and said sub-block data to said sub-block address generating means.

2. The circuit as claimed in claim 1, wherein said arithmetic means comprises;
   an absolute value circuit for calculating an absolute value of a value obtained by subtracting said sub-block boundary data from said sub-block data;
   adder means for adding the output of said absolute value circuit to generate an added signal; and
   a minimizing circuit for minimizing said added signal of said adder means.

3. The circuit as claimed in claim 1, wherein a size of a sub-block extracted from said sub-block boundary memory is larger than a size of a sub-block extracted from said first frame memory means.

4. A method of compensating for the vibration of an image, comprising the steps of:
   recording a digital luminance signal by frames;
   selecting a first sub-block of a previous frame of said digital luminance signal and a second sub-block of a current frame of said digital luminance signal;
   detecting a difference image signal by comparing said first sub-block with said second sub-block for a plurality of frames;
   detecting an amount of motion by adding said difference image signal and selecting a first minimum value of said difference image signal of sub-blocks;
   generating a location vector address value corresponding to said first minimum value;
   extracting a second minimum value from said location vector address value; and
   compensating for vibration by moving a frame screen as much as said second minimum value.

5. The method as claimed in claim 4, wherein the detection of said difference detection signal of said first and second sub-blocks is performed for each pixel of said first and second sub-blocks.

6. The method as claimed in claim 4, wherein said first and second sub-blocks are selected to have an even distribution from an entire screen.

7. A circuit for compensating for vibration of an image on a videotape, comprising:
   first address generating means for generating first row and column address data in response to a vertical synchronization signal, a horizontal synchronization signal and a clock signal;
   second address generating means for generating second row and address data in response to said vertical synchronization signal, horizontal synchronization signal and clock signal;
   first frame memory means for storing a first frame of digital luminance data in response to said first row and address data;
   second frame memory means for storing a second frame of digital luminance data in response to said second row and address data, said second frame being a subsequent frame of said first frame;
   sub-block boundary means for receiving and storing sub-block boundary data extracted from said first frame of said digital luminance data;
   sub-block memory means for receiving and storing sub-block data extracted from said second frame of said digital luminance data;
   sub-block address generating means for generating row and address data for said sub-block boundary means and said sub-block memory means, and for generating sub-block location information in response to a minimum motion detection value;
   vector register means for storing location vectors indicating motion of said sub-block boundary data, in response to said sub-block location information;
   minimizing means for calculating a minimum vector value from among said location vectors stored in said vector register means in order to control said first and second address generating means; and
   arithmetic means for calculating said minimum motion detection value by taking a plurality of sums of absolute values of differences between said sub-block boundary data and said sub-block data, and then determining a minimum of said plurality of sums.

8. The circuit as claimed in claim 7, further comprising address control means for counting said vertical synchronization signal, enabling first address generator means to generate said first row and column address data, and after completion of said storing said first frame of digital luminance data in said first frame memory means, enabling said second address generating means to generate said second row and column address data.

9. A circuit for compensating for vibration occurring during recording of a video tape, said circuit comprising:
   extraction means for extracting a plurality of current frame sub-blocks and a plurality of previous frame sub-blocks from a current frame and a previous frame of digital luminance data, respectively;
   means for making determinations of motion of each of said plurality of current frame sub-blocks by comparing said plurality of current frame sub-blocks with said plurality of previous frame sub-blocks;
   compensation means for compensating for said vibration by determining a minimum value of motion for all of said plurality of current frame sub-blocks and adjusting a starting point of a frame readout of said current frame for recording on the video tape.

10. The circuit as claimed in claim 9, wherein said pluralities of current frame sub-blocks and previous sub-blocks are selected in order to have an even distribution of said pluralities of current frame sub-blocks and previous frame sub-blocks from said current frame and said previous frame, respectively.

11. The circuit as claimed in claim 9, wherein said extraction means comprises:
   first address generating means for generating first row and column address data in response to a vertical synchronization signal, a horizontal synchronization signal and a clock signal;
   second address generating means for generating second row and column address data in response to said vertical synchronization signal, horizontal synchronization signal and clock signal;
   first frame memory means for storing said previous frame of digital luminance data in response to said first row and address data;
   second frame memory means for storing said current frame of said digital luminance data in response to said second row and address data;
   sub-block boundary means for receiving and storing sub-block boundary data extracted from said previous frame of digital luminance data;
   sub-block memory means for receiving and storing sub-block data extracted from said current frame of digital luminance data;
   sub-block address generating means for generating row and address data for said sub-block boundary means and said sub-block memory means, and for generating sub-block location information in response to a minimum motion detection value; and
   address control means for controlling said first and second address generating means to extract said pluralities of previous frame sub-blocks and current frame sub-blocks from said first and second frame memory means, respectively.

12. The circuit as claimed in claim 11, wherein said means for making determinations of motion comprises:
   absolute value means for calculating an absolute value of a difference between each pixel of a given current frame sub-block and a previous frame sub-block;
   adding means for adding each of said absolute values to generate a difference value;
   first minimizing means for calculating a minimum value of a plurality of differences values to generate a location vector indicating motion of said current frame sub-block, each of said difference values calculated by moving said current and previous frame sub-blocks one pixel in each of a positive x direction, negative x direction, positive y direction, and negative y direction and using said absolute value means and said adding means.

13. The circuit as claimed in claim 12, wherein said compensation means comprises:
   vector register means for storing a plurality of location vectors received from said sub-block address generating means; and
   second minimizing means for calculating a minimum location vector from said plurality of location vectors and transmitting said minimum location vector to said first and second address generating means.

14. The circuit as claimed in claim 11, wherein said means for making determinations of motion comprises:
   absolute value means for calculating an absolute value of a difference between each pixel of a given current frame sub-block and a previous frame sub-block;
   adding means for adding each of said absolute values to generate a difference value;
   first minimizing means for calculating a minimum value of a plurality of difference values to generate a location vector indicating motion of said current frame sub-block, each of said difference values calculated by moving said current frame sub-block one pixel in a plurality of directions and using said absolute value means and said adding means.

15. The circuit as claimed in claim 14, wherein said compensation means comprises:
   vector register means for storing a plurality of location vectors received from said sub-block address generating means; and
   second minimizing means for calculating a minimum location vector from said plurality of location vectors and transmitting said minimum location vector to said first and second address generating means.

16. A method of compensating for vibration occurring during recording of a video tape, comprising the steps of:
   extracting a current frame and a previous frame from a luminance signal of video data;
   extracting a plurality of current frame sub-blocks and a plurality of previous frame sub-blocks from said current frame and said previous frame, respectively;
   determining motion in each of said current frame sub-blocks by comparing said each of said current frame sub-blocks with corresponding ones of said previous frame sub-blocks to generate a plurality of motion vectors;
   determining vibration occurring during recording of the video tape by calculating a minimum value of said plurality of motion vectors; and
   shifting a starting point of a frame readout of said current frame to be recorded on the video tape in response to said minimum value.

17. The method as claimed in claim 16, wherein said step of determining motion further comprises:
   a first step of obtaining absolute values of differences between pixels of a first one of said current frame sub-blocks and corresponding pixels of said corresponding previous frame sub-blocks;

a second step of adding said absolute values for each of said pixels of said first one of said current frame sub-block to calculate a first summed value;

a third step of shifting a starting point of said first one of said current frame sub-blocks in a plurality of directions and repeating said first and second steps for each shifted current frame sub-block to generate shifted summed values;

a fourth step of calculating a minimum summed value of said first summed value and shifted summed values and shifting said starting points of said current frame sub-block in a direction corresponding to said minimum summed value until said first summed is less than said shifted summed values to generate a first one of said plurality of motion vectors; and a fifth step of repeating said first, second, third and fourth steps for each of said current frame sub-blocks and corresponding ones of said previous frame sub-blocks to generate second ones of said plurality of motion vectors.

18. The method as claimed in claim 16, wherein said step of determining motion further comprises:

obtaining a first plurality of absolute values of differences between pixels of a first one of said current frame sub-blocks and corresponding pixels of said corresponding previous frame sub-block and adding each of said first plurality of absolute values to generate a first summed value;

shifting a starting point of said first one of said current frame sub-blocks in a given direction;

obtaining a plurality of second pluralities of absolute values of differences, by calculating absolute values of differences between pixels of each shifted current frame sub-block and said corresponding previous frame sub-block, each of said shifted current frame sub-blocks being shifted from said current frame sub-blocks by a predetermined number of pixels in a plurality of directions and adding each of said second pluralities of absolute values to generate a plurality of second summed values;

calculating a minimum summed value by taking a smallest value of said first summed value and said plurality o second summed values and shifting said current frame sub-block in a direction corresponding to said minimum summed value and repeating said steps of obtaining a first plurality of absolute differences and obtaining a plurality of second pluralities of absolute differences until said first summed value is smaller than each of said plurality of second summed values to generate a first one of said plurality of motion vectors; and repeating said steps of obtaining a first plurality of absolute values, obtaining a plurality of second pluralities of absolute values, shifting a starting point of said first one of said current frame sub-blocks and calculating a minimum summed value for each of said current frame sub-blocks and said corresponding ones of said previous frame sub-blocks to generate second ones of said plurality of motion vectors.

19. A circuit for compensating for vibration of an image on a videotape, comprising:

address generating means for generating first row and column address data and second row and column address data in response to a vertical synchronization signal, a horizontal synchronization signal, and a clock signal;

frame memory means for storing a first frame of digital luminance data in response to said first row and address data, and for storing a second frame of digital luminance data in response to said second row and address data, said second frame being a subsequent frame of said first frame;

sub-block memory means for receiving and storing sub-block boundary data extracted from said first frame of said digital luminance data, and for receiving and storing sub-block data extracted from said second frame of said digital luminance data;

sub-block address generating means for generating row and address data for said sub-block boundary means and said sub-block memory means, and for generating sub-block location information in response to a minimum motion detection value;

vector register means for storing location vectors indicating motion of said sub-block boundary data, in response to said sub-block location information;

minimizing means for calculating a minimum vector value from among said location vectors stored in said vector register means in order to control said address generating means;

arithmetic means for calculating said minimum motion detection value by taking a plurality of sums of absolute values of differences between said sub-block boundary data and said sub-block data, and then determining a minimum of said plurality of sums.

20. A circuit for compensating for vibration occurring during recording of a video tape, said circuit comprising:

extraction means for extracting a plurality of a first frame sub-blocks and a plurality of second frame sub-blocks from a first frame and a second frame of digital luminance data, respectively, wherein said second frame is subsequent to said first frame;

means for comparing amplitudes of each one of said plurality of first frame sub-blocks with a corresponding one of said plurality of second frame sub-blocks in order to determine motions of each one of said plurality of second frame sub-blocks; and means for detecting the vibration occurring during recording by determining a minimum value of said motions and adjusting a frame readout starting point of said second frame prior to recordation on the video tape.

21. The circuit as claimed in claim 20, wherein said extraction means comprises:

memory means for storing said first and second frames;

address generating means for generating first row and column address data of said first frame of luminance data and second row and column address data of said second frame of said luminance data;

memory means for storing said first frame and said second frame in response to said first row and column address data and said second row and column address data, respectively;

sub-block memory means for storing said first frame sub-blocks and said second frame sub-blocks; and sub-block address generating means for generating said storing of said first and second frame sub-blocks in said sub-block memory means.

22. The circuit as claimed in claim 21, wherein said means for comparing amplitudes comprises:

absolute value means for generating first absolute values of differences between each one of said amplitudes of pixels of a first one of said plurality of said first frame sub-blocks and a corresponding one of said plurality of said second frame sub-blocks;

adding means for summing said absolute values of differences to generate a first summed value;

said absolute value means repeatedly performing said generating of absolute values of differences after a starting point of said second frame sub-block is shifted by a pixel in each of four different directions to generate second absolute values of differences and said adding means for summing said absolute values of differences to generate second summed values; and means for determining a minimum value of said first summed value and said second summed values.

23. The circuit as claimed in claim 22, wherein said means for comparing amplitudes generates said first summed value and said second summed values for each one of said plurality of first frame sub-blocks and said corresponding one of said plurality of second frame sub-blocks to generate a plurality of minimum values.

24. The circuit as claimed in claim 23, wherein said means for detecting the vibration comprises:

register means for storing said plurality of minimum values; and means for determining a minimum value of said plurality of minimum values to generate a least value signal to be transmitted to said address generating means.

* * * * *

UNITED STATES PATENT AND TRADEMARK OFFICE
CERTIFICATE OF CORRECTION

PATENT NO.  : 5,278,663
DATED       : January 11, 1994
INVENTOR(S) : Min-Seok Hong It is certified that error appears in the above-identified that said Letters Patent is hereby corrected as shown below:

| | | |
|---|---|---|
| Column 3, | Line 1, | Change "FIG." to --FIG.1-- ; |
| | Line 23, | After "8x8", Change "to" to --and-- ; |
| Column 4, | Line 7, | After "processed", Delete "by". |
| Column 5, | Line 45, | Preceding "information", Insert --location-- ; |
| Column 9, | Line 16, | After "summed", Insert --value-- ; |
| | Line 46, | After "plurality", Change "o" to --of-- . |

Signed and Sealed this

First Day of November, 1994

BRUCE LEHMAN

*Attest:*

*Attesting Officer*   *Commissioner of Patents and Trademarks*